June 21, 1955 M. A. THORNE 2,711,229
BRAKE WITH HYDRAULIC LINE SEAL
Filed July 29, 1953 2 Sheets-Sheet 1
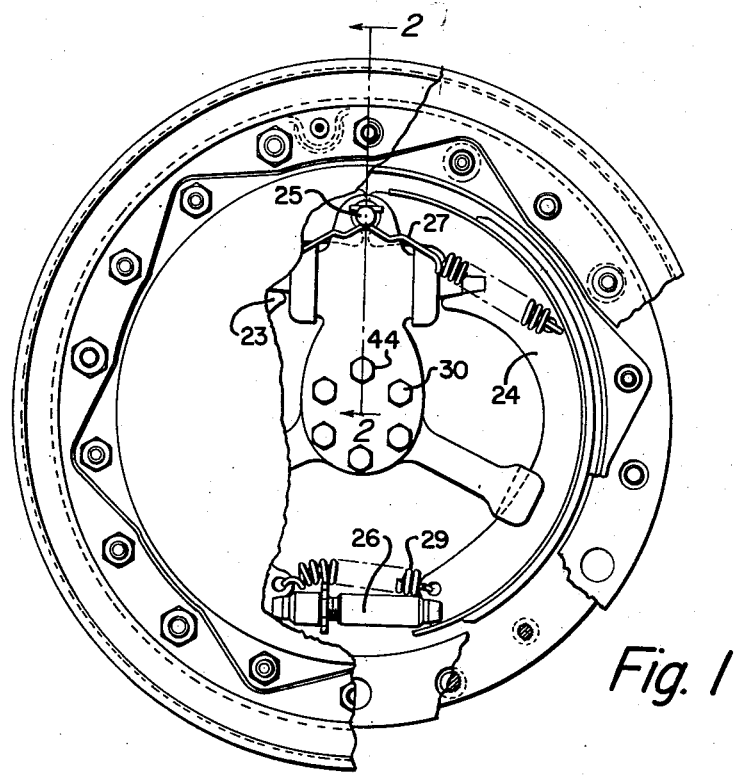
Fig. 1
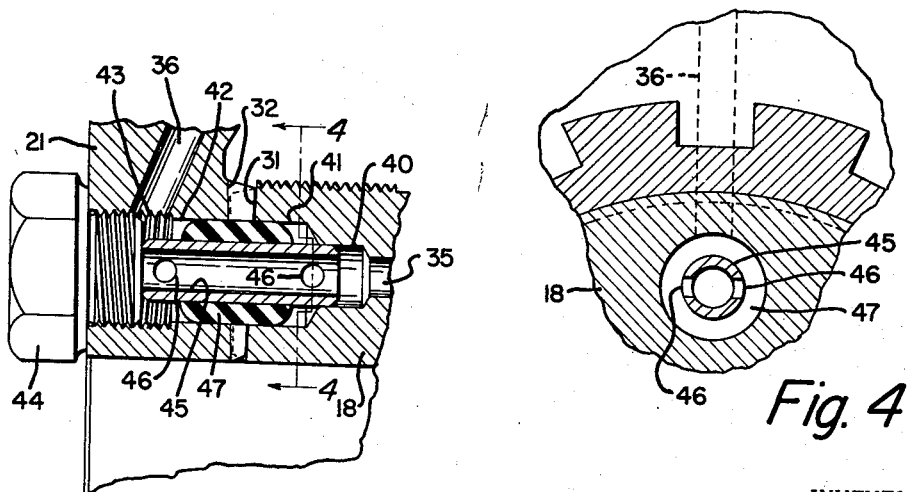
Fig. 3
Fig. 4
INVENTOR
Maurice A. Thorne
BY
Attorney June 21, 1955    M. A. THORNE    2,711,229
BRAKE WITH HYDRAULIC LINE SEAL
Filed July 29, 1953    2 Sheets-Sheet 2

INVENTOR.
Maurice A. Thorne
BY
Attorney

United States Patent Office 2,711,229
Patented June 21, 1955

2,711,229

BRAKE WITH HYDRAULIC LINE SEAL

Maurice A. Thorne, Detroit, Mich., assignor to General Motors Corporation, Detroit, Mich., a corporation of Delaware Application July 29, 1953, Serial No. 371,031

4 Claims. (Cl. 188—152)

This invention relates to a seal structure incorporated in a brake assembly positioned on the outboard side of a wheel wherein the seal member is placed in the hydraulic line positioned internally of the wheel and brake structure, the seal member being placed at the juncture between the wheel assembly and the brake assembly.

It is becoming increasingly desirable to place the brake assembly in an automotive wheel on the outboard side of the wheel whereby access can readily be gained to the brake assembly for adjustment and repair thereof. Such an arrangement requires that the brake assembly be removably carried on the wheel spindle thereby causing a joint between the brake assembly and the wheel spindle.

Further, it is desirable that all of the hydraulic line passages for carrying fluid under pressure to the hydraulic brake assembly be incorporated in the structure comprising the spindle and the brake assembly, whereby to eliminate extraneous fittings and pipes for carrying the hydraulic fluid under pressure.

However, in a structural arrangement of the device as heretofore described, the hydraulic line passages in the wheel spindle and in the brake assembly are discontinuous at the joint between the brake assembly and the wheel spindle, thus requiring placement of a line seal at this point to prevent loss of hydraulic fluid from the line passages.

It is therefore an object of this invention to provide a line seal between adjoining hydraulic line passages to seal the joint between the discontinuous passages and to accommodate some misalignment of the line passages.

Another object of the invention is to provide a line seal of the type referred to in the foregoing object wherein primary sealing is occasioned by resilient frictional engagement with the walls of the line passages or chambers formed thereby, and is supplemented by the effect of the fuid pressure in the hydraulic line passages.

A still further object of the invention is to provide a line seal in accordance with foregoing objects wherein the seal member comprises a rigid core element having a passage through the same for conducting hydraulic fluid between the discontinuous line passages and a resilient rubber-like member is provided around the rigid core and bonded thereto, the resilient member frictionally engaging the walls of the discontinuous line passages for sealing the juncture between the same and being expansible under the influence of fluid pressures in the line passages whereby to supplement the sealing effect of the resilient member in engagement with the walls of the line passages.

Further objects and advantages of the present invention will be apparent from the following description, reference being had to the accompanying drawings wherein a preferred form of the invention is clearly shown.

In the drawings:

Figure 1 is a front elevational view of a brake and wheel structure in which the features of this invention are incorporated.

Figure 3 is an enlarged cross sectional view of the hydraulic line seal illustrated in Figure 2.

Figure 4 is a cross sectional view taken along line 4—4 of Figure 3.

Figure 2:
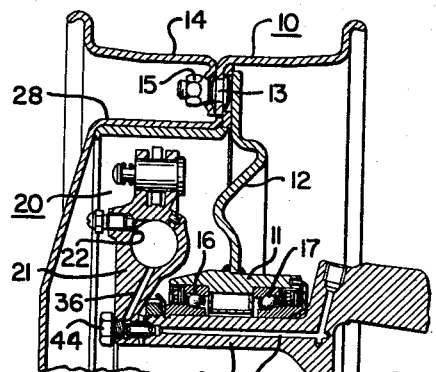
Figure 2 is a cross sectional view taken along line 2—2 of Figure 1.

For the purpose of illustrating the invention, in Figures 1 and 2 there is shown a wheel structure and a brake assembly incorporating the feature of the line seal of this invention. The wheel structure 10 comprises a hub 11 incorporating a wheel disk 12 extending radially therefrom. The outer end of the wheel disk carries a plurality of wheel studs 13 that secure a tire rim 14 in position on the disk 12 by means of the nuts 15.

The wheel hub 11 is supported by anti-friction bearings 16 and 17 on the wheel spindle 18.

At the forward end of the wheel spindle 18 there is positioned a brake assembly 20 that includes a wheel spider 21 having a hydraulic wheel cylinder 22 provided therein. The brake assembly includes the brake shoes 23 and 24 that have adjacent ends engaging the anchor pin 25, opposite adjacent ends of the brake shoes 23 and 24 engaging the adjusting device 26. Retraction springs 27 retain the brake shoes out of engagement with the brake drum 28, and the spring 29 retains the said opposite ends of the brake shoes in engagement with the ends of the adjusting device 26.

The brake spider 21 is secured to the forward end of the wheel spindle 18 by means of bolts 30 extending therebetween. The forward face 31 of the wheel spindle 18 is provided with radial serrations, comparable radial serrations being formed on the rear face 32 of the brake spider 21 whereby relative rotation between the spider 21 and the wheel spindle 18 is prevented.

To provide for hydraulic fluid to be supplied to the wheel cylinder 22, a hydraulic fluid line passage 35 extends through the body of the wheel spindle 18. A hydraulic line passage 36 extends through the body of the spider 21 and connects the wheel cylinder 22 with the hydraulic line passage 35 at the juncture formed between adjoining faces 31 and 32 of the wheel spindle 18 and spider 21 respectively.

In Figure 3 there is illustrated the hydraulic line seal that is placed between the hydraulic line passages 35 and 36 at the juncture of these passages formed between the spider 21 and the wheel spindle 18.

The hydraulic line passage 35 has a first enlarged chamber 40 and a second enlarged chamber 41, both of which are coaxial with the line passage 35. The chamber 41 terminates at the face 31 of the spindle 18.

The hydraulic line passage 36 in the brake spider 21 terminates in a chamber 42 that is of the same diameter as the chamber 41. One end of the chamber 42 terminates at the face 32 of the brake spider 21, the opposite end of the chamber 42 having an internally threaded portion 43 that receives the plug 44 to close that end of the chamber and to assure central positioning of the seal relative to the juncture between the spindle 18 and the spider 21.

The hydraulic line seal comprises a rigid metal tubular member 45 having transversely drilled passages 46 in the ends thereof. This tube 45 and the passages 46 provide connection between the line passages 35 and 36 irrespective of which end of the tubular member 45 is adjacent the respective line passages, thus making the seal member interchangeable endwise.

The tubular member 45 has a resilient rubber-like annular ring 47 encircling the member 45 substantially at the mid portion thereof, and bonded thereto. The resilient member 47 is just slightly larger in diameter than the internal diameter of the chambers 41 and 42, thus providing for slight frictional engagement of the surfaces of the resilient annular ring 47 with the peripheral surfaces of the chambers 41 and 42, whereby to seal against the said chambers. The resilient member 47 spans the joint provided between the discontinuous passages 35 and 36 as created between the spindle 18 and the brake spider 21 at the faces 31 and 32 thereof respectively.

The line seal just described may be inserted readily manually without the necessity of force tools, sufficient frictional sealing being provided between the resilient member 47 and the walls of the chambers 41 and 42 to prevent loss of hydraulic fluid through the juncture between the spindle 18 and the spider 21 at low hydraulic line pressures.

However, the frictional sealing between the resilient member 47 and the walls of the chambers 41 and 42 is supplemented by the pressure of the fluid within the hydraulic lines 35 and 36 by engagement of the fluid with opposite ends of the resilient member 47. Equal fluid pressure being applied to equal areas on opposite ends of the resilient member 47 provides for hydraulic balance on the seal member to prevent it from shifting longitudinally of the chambers 41 and 42 and thus relative to the joint between the spindle 18 and the spider 21. Further, the fluid pressure causes the resilient member 47 to be placed under compression resulting in expansion of the resilient member against the walls of the chambers 41 and 42 to increase the sealing effect between the resilient member 47 and the walls of the chambers in proportion to the increase in fluid pressure in the hydraulic lines 35 and 36 resulting from application of the brakes.

Figure 8:
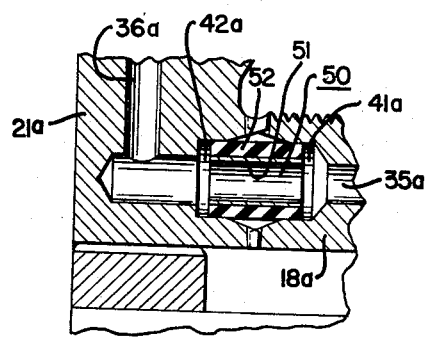
Figure 8 is a cross sectional view similar to Figure 3 illustrating still another modified form of line seal.

In Figure 8 the hydraulic line seal 50 is quite similar to that heretofore described in that it is positioned to span the juncture between the wheel spindle 18a and the brake spider 21a, the seal 50 being placed within the chambers 42a and 41a in the spider and spindle respectively.

The seal 50 comprises a rigid tube 51 having the annular resilient rubber-like ring 52 bonded thereto and in engagement with the inner peripheral surfaces of the chambers 41a and 42a. The functioning of the seal 50 is identical with that heretofore described with reference to Figure 3.

Figure 5:
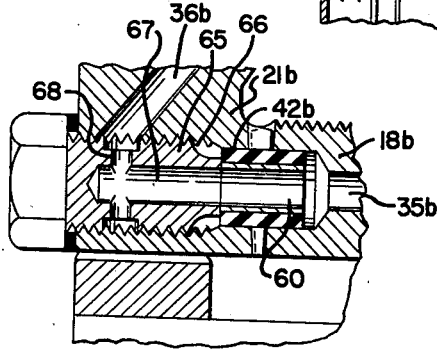
Figure 5 is a cross sectional view of a modified form of line seal.

In Figure 5 there is illustrated a seal 60 that is the same as the seal 50 to span the juncture between the brake spider 21b and the wheel spindle 18b in the same manner as illustrated in Figure 8. However, in this modification the seal 60 abuts one end of a plug 65 that threadedly engages the threaded portion 66 of the chamber 42b to assure that the seal 60 is positioned centrally relative to the juncture between the spindle 18b and the spider 21b. The plug 65 has an axial passage 67 and a transverse passage 68 for connection of the line passage 36b with the line passage 35b. The function of the seal member 60 is identical with the seal member 50 heretofore described.

Figure 9:
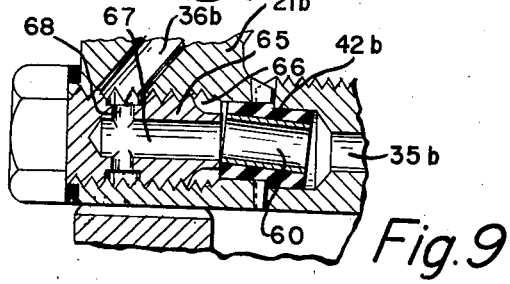
Figure 9 is a cross sectional view like Figure 5 but illustrating the seal member accommodating a misalignment of the hydraulic line passages.

In Figure 9 there is illustrated the position of the parts assumed when the line passages are slightly out of alignment, the resilient member 47 accommodating the misalignment.

Figure 6:
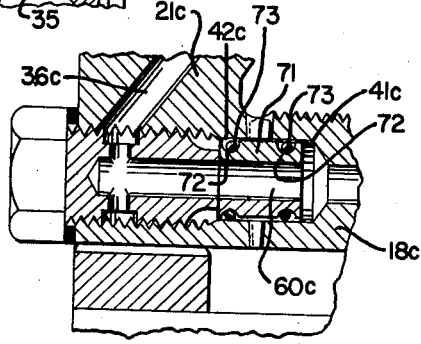
Figure 6 is a cross sectional view similar to Figure 3 but illustrating a further modified form of line seal.

In Figure 6 there is illustrated another slightly modified form of seal that is similar to that in Figure 5 with the exception that the metal sleeve 60c is provided with annular grooves 72 at each end thereof, each annular groove receiving an O ring 73. The O rings 73 thus provide resilient engagement with the walls 42c and 41c of the wheel spider 21c and spindle 18c respectively.

The O rings frictionally seal against loss of fluid at low pressures in the same manner as the seal structures heretofore described, but in addition can expand into engagement with the walls 42 and 41c under the influence of higher fluid pressure applied to opposite ends of the seal and longitudinally move toward the median point between opposite ends of the seal into forced engagement with the walls of the chambers 42c and 41c.

Figure 7:
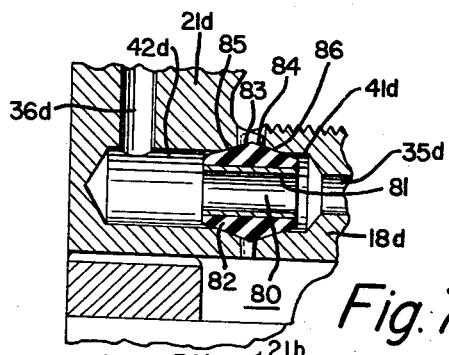
Figure 7 is a cross sectional view similar to Figure 3 illustrating another modified form of line seal.

In Figure 7 there is illustrated another modified form of seal 80 that spans the juncture between the wheel spider 21d and the spindle 18d. In this modification the seal 78 comprises a rigid tube 81 having the resilient rubber-like annular ring 82 bonded thereto. The outer periphery of the ring 81 has conical surfaces 83 and 84 that engage corresponding conical surfaces 85 and 86 provided by the walls of the chambers 41d and 42d.

Thus, in the seal illustrated in Figure 7 there is provided the initial frictional sealing engagement between the resilient member 82 and the walls of the chambers 42d and 41d as well as slight compression frictional sealing caused by attachment of the spider 21d to the end of the spindle 18d. Further, the fluid pressure in the line passages 36d and 35d will engage the opposite ends of the resilient member 82 to compress the same and thus provide expansion thereof into further sealing engagement with the walls of the chambers 42d and 41d in proportion to the pressure of the fluid in the line passages 35d and 36d, these passages having equal pressures therein.

In all of the seal structures illustrated herein, it will be noted that there is hydraulic balance so that no axial movement of the metal portion of the seal member results from varying pressures in the line passages, and in each instance the line pressures effect supplemental sealing of the resilient portion of the seal member in proportion to the fluid line pressures by causing expansion of the resilient members into engagement with the chambers retaining the same.

While the form of embodiment of the invention as herein disclosed constitutes a preferred form, it is to be understood that other forms might be adopted as may come within the scope of the claims which follow.

What is claimed is as follows:

1. A seal assembly extending between two hydraulic line passages and bridging a joint therebetween, said seal assembly comprising in the combination, a first chamber means in the end of one of the line passages at the joint between the said passages, a second chamber means in the end of the other line passage at the joint between the said passages, and a hydraulically balanced seal member in said chambers in resilient engagement with the walls thereof, said seal member comprising a rigid hollow tube and a resilient annular ring encircling said rigid member and bonded thereto, said annular ring having identical cross sectional areas extending from outer opposite ends to the median point thereof.

2. A seal assembly extending between two hydraulic line passages and bridging a joint therebetween, said seal assembly comprising in the combination, a first chamber means in the end of one of the line passages at the joint between the said passages, a second chamber means in the end of the other line passage at the joint between the said passages, said chamber means being of uniform diameter, and a hydraulically balanced seal member in said chambers in resilient engagement with the walls thereof, said seal member comprising a rigid hollow tube having a resilient annular ring encircling the same and bonded thereto, said ring having the portion thereof in engagement with said chamber means of uniform diameter for uniform frictional engagement with the walls of said chamber means, opposite ends of said ring being exposed to the fluid pressure in said passages whereby to compressibly expand the said ring into engagement with the walls of said chamber means in proportion to the fluid pressure in the said passages.

3. In a wheel structure having a spindle mounting a wheel with a fluid operated brake assembly for the wheel mounted separately on the spindle, the spindle being provided with a fluid line passage that substantially aligns with a fluid line passage in the brake assembly for conducting fluid to the actuating device of the brake assembly, a seal assembly extending between the said line passages and bridging a joint therebetween, said seal assembly comprising in the combination, a first chamber means in the end of one of the line passages at the joint between the said passages, a second chamber means in the end of the other line passage at the joint between the said passages, and a hydraulically balanced seal member in said chambers in resilient engagement with the walls thereof, said seal member comprising a rigid hollow tube and a resilient annular ring encircling said rigid member and bonded thereto, said annular ring having identical cross sectional areas extending from outer opposite ends to the median point thereof.

4. In combination, a wheel spindle having a brake line fluid passage therein, a brake assembly carried on said spindle and including a mounting structure incorporating therein a fluid actuated wheel cylinder and a brake line fluid passage for feeding the same, said brake assembly being carried on the outboard end of said spindle, said brake line fluid passages substantially aligning at the joint between said brake assembly and said spindle, a seal member bridging the said joint to seal the same, said seal member comprising a hollow rigid core member having a resilient annular sealing ring encircling the same and bonded thereto frictionally engaging the walls of said line passages on each side of the said joint, said annular ring being of identical cross section from opposite ends toward the median point thereof whereby to provide for hydraulic balance of the said seal member to maintain the same centralized relative to the joint between said passages.

References Cited in the file of this patent

UNITED STATES PATENTS

| 813,454 | Schaad | Feb. 27, 1906 |
| 2,649,922 | Hutchinson et al. | Aug. 25, 1953 |

FOREIGN PATENTS

| 12,614 | Great Britain | Oct. 5, 1886 |
| 11,610 | Great Britain | May 21, 1902 |
| 561,349 | Great Britain | May 16, 1944 |
| 578,408 | Germany | June 13, 1933 |